United States Patent
Kim et al.

(10) Patent No.: US 10,221,311 B2
(45) Date of Patent: Mar. 5, 2019

(54) BALANCING WEIGHT COMPOSITION WITH EXCELLENT EXTRUDABILITY

(71) Applicants: HYUNDAI MOTOR COMPANY, Seoul (KR); HWASEUNG MATERIAL, Yangsan-si, Gyeongsangnam-do (KR)

(72) Inventors: Hyung Seok Kim, Seoul (KR); Woo Won Youn, Busan (KR); Mu Jung Lee, Busan (KR); Tae Geun Kim, Yangsan-si (KR); Jong Hyun Park, Busan (KR)

( * ) Notice: Subject to any disclaimer, the term of this patent is extended or adjusted under 35 U.S.C. 154(b) by 108 days.

(21) Appl. No.: 15/376,402

(22) Filed: Dec. 12, 2016

(65) Prior Publication Data

US 2018/0112073 A1    Apr. 26, 2018

(30) Foreign Application Priority Data

Oct. 25, 2016  (KR) .......................... 10-2016-0139313

(51) Int. Cl.

| C08L 67/02 | (2006.01) |
|---|---|
| F16F 15/32 | (2006.01) |
| C08L 63/00 | (2006.01) |
| C08L 51/04 | (2006.01) |
| C08K 3/08 | (2006.01) |

(52) U.S. Cl.
CPC .............. *C08L 67/02* (2013.01); *F16F 15/32* (2013.01); *F16F 15/324* (2013.01); *C08L 2205/03* (2013.01); *F16F 2224/02* (2013.01); *F16F 2226/04* (2013.01)

(58) Field of Classification Search
CPC ...... C08L 67/02; C08L 2205/03; F16F 15/32; F16F 15/324; F16F 2224/02; F16F 2226/04
USPC ......................................................... 523/436
See application file for complete search history.

(56) References Cited

U.S. PATENT DOCUMENTS

| 2010/0072662 A1* | 3/2010 | Wang ........................ C08J 3/205 264/241 |
|---|---|---|
| 2013/0037213 A1* | 2/2013 | Frick ....................... C08G 18/10 156/330 |

FOREIGN PATENT DOCUMENTS

| CN | 103525041 A | * | 1/2014 | ........ B29C 47/0011 |
|---|---|---|---|---|
| JP | 2002-105324 A | | 4/2002 | |
| JP | 2004-43700 A | | 2/2004 | |
| KR | 10-1498263 B1 | | 3/2015 | |
| KR | 10-2015-0086526 A | | 7/2015 | |
| WO | 2015/067660 A1 | | 5/2015 | |

OTHER PUBLICATIONS

Qingdao Xinzhan Plastic Co. Ltd., CN 103525041 A machine translation in English, Jan. 22, 2014 (Year: 2014).*

* cited by examiner

*Primary Examiner* — David T Karst
(74) *Attorney, Agent, or Firm* — Knobbe Martens Olson & Bear LLP

(57) ABSTRACT

A balancing weight composition with excellent extrudability is provided. More specifically, the balancing weight composition includes a stainless steel and a resin base, wherein the resin base includes a polyester-based engineering plastic, an epoxy resin and an ionically cross-linked elastomer at a suitable content ratio to improve extrusion flowability, flexural strength and adhesive strength of a molded material.

7 Claims, 2 Drawing Sheets

US 10,221,311 B2

BALANCING WEIGHT COMPOSITION WITH EXCELLENT EXTRUDABILITY

CROSS-REFERENCE TO RELATED APPLICATION

This application claims under 35 U.S.C. § 119(a) the benefit of priority to Korean Patent Application No. 10-2016-0139313 filed on Oct. 25, 2016, the entire contents of which are incorporated herein by reference.

BACKGROUND

(a) Field

The present disclosure relates to a balancing weight composition with excellent extrudability.

(b) Background Art

In general, tire wheels of vehicles generate vibration due to centrifugal force by rotation when there are unbalanced parts, thus causing noise, uneven wear and handle shaking and the like. In particular, wheel balance should be accurate upon high-speed driving. In order to correct unbalance of vehicle wheels, a wheel balancing weight with a suitable weight is installed at an edge opposite to a part causing weight unbalance in the wheels or rims so that the opposite direction of centrifugal force is generated to keep the balance thereof.

A typical method of adhering a 5 g lead (Pb) weight as a balancing weight material to a tire or rim with a tape-type adhesive is known. However, disadvantageously, lead (Pb) is considered to be a substance harmful to the environment, is corroded by salty water when stood for a long time and has deterioration in accuracy due to use of 5 g unit resulting from insufficient flexibility. In addition, when a tape-type adhesive is applied to a curved surface of a vehicle wheel, problems such as deteriorated adhesive strength, interface separation upon use for a long time and peeling are generated. In addition, typical balancing weights are inapplicable to automatic processes and are thus conducted manually, thus inevitably generating frequent errors.

In addition, thermosetting and thermoplastic composites were used as balancing weights, rather than metals such as lead.

Korean Patent Laid-open No. 10-2015-0086526 (Patent Document 1) discloses a method of forming a balancing weight with a profile of uncured/unvulcanized viscoelastic polymer containing a high-density filler. This method uses, as a high-density filler, stainless steel, tungsten, zinc or zinc oxide. In addition, as the uncured/unvulcanized viscoelastic polymer, an ethylene copolymer and acrylate is used. However, Patent Document 1 aims at improving heat resistance using an uncured/unvulcanized viscoelastic polymer.

PCT No. WO 2015-067660 (Patent Document 2) discloses a balancing weight material including a hot melt adhesive and a high-density mass material. Specifically, the hot melt adhesive includes a thermoplastic resin such as polyolefin, an ethylene-vinyl acetate (EVA) copolymer or the like and the high-density mass material includes metal particles such as stainless steel, tungsten, zinc and zinc oxide particles. However, Patent Document 2 discloses only a balancing weight material using a thermoplastic resin as a base resin.

Japanese Patent Publication No. 2002-105324 (Patent Document 3) and Japanese Patent Publication No. 2004-43700 (Patent Document 4) disclose a high-specific gravity article produced by extrusion-molding a composition containing a theremosetting or theremoplastic synthetic resin and a tungsten powder. However, Patent Documents 3 and 4 disclose only a balancing weight material including a tungsten powder incorporated in a general theremosetting or theremoplastic polymer resin.

PATENT DOCUMENT (Patent Document 1) Korean Patent No. 10-2015-0086526 entitled "Wheel balancing method"

(Patent Document 2) PCT No. WO 2015-067660 entitled "Method and Device for Balancing a Wheel by Application of a Hot-Melt Adhesive Balancing Mass"

(Patent Document 3) Japanese Patent Publication No. 2002-105324 entitled "High-specific gravity article"

(Patent Document 4) Japanese Patent Publication No. 2004-43700 "High-specific gravity spherical resin and method of preparing the same"

The disclosure of this section is to provide background of the invention. Applicant notes that this section may contain information available before this application. However, by providing this section, Applicant does not admit that any information contained in this section constitutes prior art.

SUMMARY

Accordingly, it is one aspect of the present invention to provide a balancing weight material with a novel composition exhibiting superior physical properties to typical balancing weights.

It is another aspect of the present invention to provide an extruded article produced by extrusion-molding the balancing weight material with a novel composition.

It is yet another aspect of the present invention to provide a balancing weight produced by extrusion-molding the balancing weight material with a novel composition.

A further aspect of the present invention provides a balancing weight composition including a stainless steel powder and a resin base, wherein the resin base includes (1) 80 to 90% by weight of a polyester-based engineering plastic, (2) 1 to 10% by weight of an epoxy resin, and (3) 5 to 15% by weight of an ionically cross-linked elastomer produced by graft-polymerizing an EPDM rubber with a carboxylic acid monomer.

Other aspects and embodiments of the invention are discussed infra.

BRIEF DESCRIPTION OF THE DRAWINGS

The above and other features of the present invention will now be described in detail with reference to certain embodiments thereof illustrated the accompanying drawings which are given hereinbelow by way of illustration only, and thus are not limitative of the present invention, and wherein.

Figure 1:
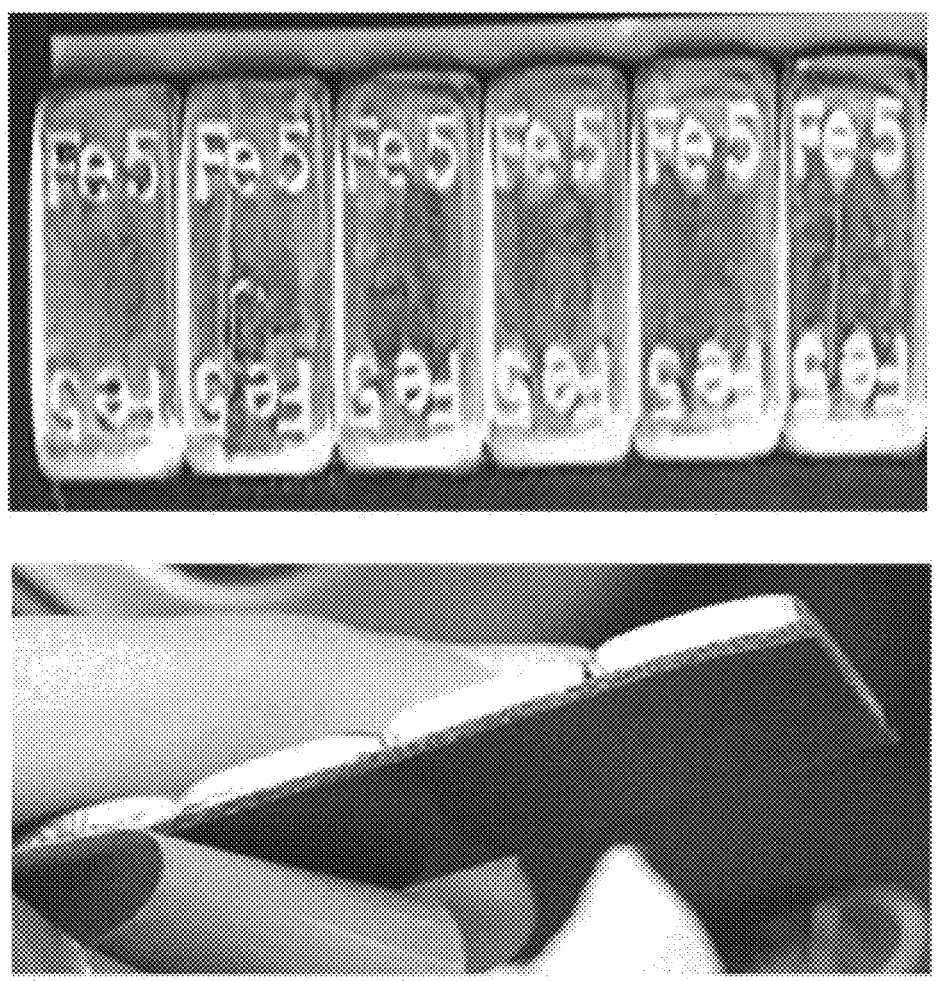
FIG. 1 shows images showing a typical molded balancing weight.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of embodiments of the present invention throughout the several figures of the drawing.

DETAILED DESCRIPTION

Hereinafter, reference will now be made in detail to various embodiments of the present invention, examples of which are illustrated in the accompanying drawings and described below. While the invention will be described in conjunction with embodiments, it will be understood that the present description is not intended to limit the invention to those embodiments. On the contrary, the invention is intended to cover not only the embodiments, but also various alternatives, modifications, equivalents and other embodiments, which may be included within the spirit and scope of the invention as defined by the appended claims. In the following description of the present invention, a detailed description of known functions and configurations incorporated herein will be omitted when it may obscure the subject matter of the present invention.

Hereinafter, embodiments of the present invention will be described in detail.

The balancing weight composition according to embodiments of the present invention includes a stainless steel powder and a resin base.

In an embodiment, the high-density mass material is stainless steel. The stainless steel refers to steel that does not rust under general environments. The stainless steel is classified into austenite, ferrite, martensite and the like depending on internal structures of metal and the present invention is not particularly limited to stainless steel. Specifically, the stainless steel may be selected from commercially available stainless steel products, such as, SUS 304, 340, 410, 430, 600 and 630 series products.

In an embodiment, the resin base includes a polyester-based engineering plastic, an epoxy resin and an ionically cross-linked elastomer.

In an embodiment, the amount of the resin base present in the balancing weight composition may be 5 to 15 parts by weight, based on 100 parts by weight of stainless steel used as a high-density mass material. In another embodiment, the amount of the resin base present in the balancing weight composition is 3 to 17 parts by weight, based on 100 parts by weight of stainless steel. In embodiments, the amount of the resin base present in the balancing weight composition is 3, 5.5, 7, 8.5, 9.2, 9.5, 9.9, 10.3, 10.5, 11, 11.8, 12.5, 13.5, 14, 15 and 17 parts by weight, based on 100 parts by weight of stainless steel. In embodiments, the amount of resin base is in a range formed by any two numbers selected from those listed above.

When the content of the resin base is generally less than 5 parts by weight (not absolute), based on 100 parts by weight of stainless steel, folding endurance, flowability and extrudability defects may occur. On the other hand, when the amount of the resin base exceeds generally 15 parts by weight (not absolute), based on 100 parts by weight of stainless steel, low specific gravity phenomenon may occur upon composition extrusion.

The resin base included in the balancing weight composition according to embodiments of the present invention will be described in detail.

(1) Polyester-Based Engineering Plastic

Engineering plastics are crystalline resins which improve extrudability, mechanical properties, heat resistance and abrasion resistance of balancing weights. In addition, the engineering plastics are not readily deformed even under high heat and high load conditions and are advantageously efficient as balancing weight materials.

In an embodiment, the engineering plastics may include at least one selected from the group consisting of polyamide resins, polyacetyl resins, polycarbonate resins, polyester resins and modified polyphenylene oxide (PPO).

In an embodiment, the engineering plastics may be polyester resins. Specifically, the polyester-based engineering plastic may include at least one selected from the group consisting of polyethylene terephthalate (PET), polybutylene terephthalate (PBT), polyethylene naphthalate (PEN) and polybutylene naphthalate (PBN).

In an embodiment, the polyethylene terephthalate or polybutylene terephthalate may be prepared by copolymerizing a diol compound such as ethylene glycol or 1,4-butane diol with dimethyl terephthalate. The copolymerization may be carried out by a process of producing methanol by heating a monomer mixture at a high temperature, so-called "transesterification".

In an embodiment, the polyethylene naphthalate or polybutylene naphthalate may be prepared by copolymerizing a diol compound such as ethylene glycol or 1,4-butane diol with naphthalene dicarboxylic acid.

In an embodiment, the polyester-based engineering plastic may be present in an amount of 80% by weight to 90% by weight in the resin base included in the balancing weight composition. In another embodiment, the polyester-based engineering plastic is present in an amount of 75% by weight to 92% by weight in the resin base. In embodiments, the polyester-based engineering plastic is present in an amount of 75, 78, 80, 82, 83, 84, 84.5, 85, 86, 88, 90 and 92% by weight in the resin base. In embodiments, the polyester-based engineering plastic is present in an amount in a range formed by any two numbers selected from those listed above.

When the content of the polyester-based engineering plastic is generally less than 80% by weight (not absolute), defects of folding endurance, flowability, extrudability and the like of the balancing weight may occur. On the other hand, when the content of the polyester-based engineering plastic exceeds generally 90% by weight (not absolute), low specific gravity phenomenon may occur upon composition extrusion.

(2) Epoxy Resin

According to embodiments of the present invention, the composition includes an epoxy resin to improve wear resistance and corrosion resistance of the balancing weight. In addition, the epoxy resin has excellent adhesive strength to the engineering plastic and the ionically cross-linked elastomer present in the balancing weight composition and thus functions to prevent release of the balancing weight from wheels.

In an embodiment, the epoxy resin may be a room-temperature curable two-component epoxy resin. The room-temperature curable two-component epoxy resin is used to treat the surface of an extruded material to improve extrudability and the extruded material surface-treated with an epoxy resin thus has improved corrosion resistance and wear resistance. In addition, the room-temperature curable two-component epoxy resin exhibits excellent chemical resistance to most solvents and advantageously has no restriction on solvent selection. Specifically, the room-temperature curable two-component epoxy resin may include at least one selected from the group consisting of amine curable epoxy resins.

In an embodiment, the epoxy resin may be present in an amount of 1% by weight to 10% by weight in the resin base included in the balancing weight composition. In another embodiment, the epoxy resin is present in an amount of 0.5% by weight to 15% by weight in the resin base. In embodiments, the epoxy resin is present in an amount of 0.5, 1, 2, 3, 4, 4.5, 5, 5.5, 6, 7, 8, 10, 12 and 15% by weight in the resin base. In embodiments, the epoxy resin is present in an amount in a range formed by any two numbers selected from those listed above.

When the content of the epoxy resin is generally less than 1% by weight (not absolute), wear resistance and corrosion resistance of the balancing weight and improvement of adhesive strength to adhesives cannot be obtained. On the other hand, when the content of the epoxy resin exceeds generally 10% by weight (not absolute), specific gravity of the extrusion composition may be greatly deteriorated.

(3) Ionically Cross-Linked Elastomer

The ionically cross-linked elastomer of embodiments of the present invention is a graft copolymer obtained by copolymerizing an ethylene propylene diene monomer rubber (EPDM rubber) with a carboxylic acid monomer. The ionically cross-linked elastomer has excellent elasticity of cross-linked rubbers and thus superior mechanical properties and flexural strength, thus functioning to improve folding endurance of the extruded material.

In an embodiment, the carboxylic acid monomer is a carboxylic acid compound having 3 to 10 carbon atoms and includes at least one selected from the group consisting of acrylic acid, methacrylic acid, crotonic acid, isocrotonic acid, maleic acid, fumaric acid, citraconic acid, mesaconic acid, glutaconic acid, itaconic acid and anhydrides thereof.

In an embodiment, a graft ratio of the carboxylic acid monomer in the graft copolymer may be adjusted to be 1.45 to 2.00% by weight. In another embodiment, a graft ratio of the carboxylic acid monomer in the graft copolymer is 1.4 to 2.10% by weight. In embodiments, a graft ratio of the carboxylic acid monomer in the graft copolymer is 1.4, 1.45, 1.5, 1.55, 1.6, 1.65, 1.7, 1.8, 1.9, 2.0 and 2.1% by weight. In embodiments, a graft ratio of the carboxylic acid monomer in the graft copolymer is in a range formed by any two numbers selected from those listed above.

When the graft ratio of the carboxylic acid monomer is generally less than 1.45% by weight (not absolute), high-temperature flowability increases and extrudability and moldability are bad. On the other hand, when the graft ratio of the carboxylic acid monomer exceeds generally 2.00% by weight (not absolute), dispersibility and extrudability may be deteriorated due to difference in flowability between the polyester-based engineering plastic resin and the carboxylic acid monomer.

In embodiments of the present invention, copolymerization is conducted to produce an ionically cross-linked elastomer and the copolymerization may be carried out by an ordinary method.

In an embodiment, a polymerization initiator may be used for copolymerization of the EPDM rubber with the carboxylic acid monomer. The polymerization initiator may be peroxide and specifically may include at least one selected from the group consisting of dicumyl peroxide, 2,5-bis (tertiary-butylperoxy)-2,5-dimethylhexane and bis(tertiary-butylperoxyisobutyl) benzene.

In an embodiment, a solvent may be further added during the copolymerization. The solvent for copolymerization may include at least one selected from the group consisting of xylene, acetone and ethanol. In an embodiment, after copolymerization, the graft copolymer may be extracted and separated from the solvent. The extraction of the graft copolymer may be carried out by Soxhlet extraction.

In an embodiment, the ionically cross-linked elastomer may be present in an amount of 5% by weight to 15% by weight in the resin base included in the balancing weight composition. In another embodiment, the ionically cross-linked elastomer is present in an amount of 0.3% by weight to 16% by weight in the resin base. In embodiments, the ionically cross-linked elastomer is present in an amount of 0.3, 0.5, 1, 1.5, 2, 2.5, 3.5, 4, 5.5, 6, 7, 7.5, 8.5, 9, 10, 11, 11.5, 12, 13, 14, 15 and 16% by weight in the resin base. In embodiments, the ionically cross-linked elastomer is present in an amount in a range formed by any two numbers selected from those listed above.

When the content of the ionically cross-linked elastomer is generally less than 5% by weight (not absolute), flexibility may be deteriorated during extrusion-molding of the composition. On the other hand, when the content of the ionically cross-linked elastomer exceeds generally 15% by weight (not absolute), dispersibility of the ionically cross-linked elastomer in the composition may be deteriorated due to low flowability and relatively high melting point which are inherent characteristics of the ionically cross-linked elastomer. For this reason, the surface of an extruded material may become rough and extrusion may be stopped during extrusion-molding of the composition.

As described above, the balancing weight composition according to embodiments of the present invention contains, as a high-density material, stainless steel, thus preventing rusting and offering excellent corrosion resistance and wear resistance. In addition, due to use of a certain composition of resin base, the composition may be cut at an accurate unit of 1 g or less upon use. In addition, the resin base includes a polyester-based engineering plastic with excellent flexibility, an epoxy resin used for surface treatment of an extruded material to improve extrudability and an ionically cross-linked elastomer for improving extrusion flowability and flexibility at a suitable content ratio to improve extrusion flowability, flexural strength and adhesive strength.

Hereinafter, the present invention will be described in more detail with reference to examples. However, the examples are provided only for illustration of the present invention and the scope of the present invention is not limited to the examples.

EXAMPLE

Example 1 and Comparative Examples 1 to 5

(1) Preparation of Balancing Weight Composition

A SUS630 powder as a high-density material was mixed with a resin base shown in the following Table 1 at a weight ratio of 100/10 to prepare a balancing weight composition. Respective ingredients of the resin base are as follows.

[Resin Base]

① Engineering plastics: polybutylene terephthalate (PBT), produced by Toyo Tire & Rubber. Co., Ltd.

② Epoxy resin: room-temperature curable two-component epoxy resin, P-5250®, produced by Poonglim Co., Ltd.

③ Ionically cross-linked elastomer: a graft copolymer of an EPDM rubber and itaconic acid, graft ratio: 1.70% by weight (2) Extrusion Molding of Balancing Weight Molded Material The balancing weight compositions prepared in Example 1 and Comparative Examples 1 to 5 were extrusion-molded under the following conditions.

[Extrusion-Molding Condition]
① Extrusion-molding machine: Thermo Fisher Scientific Inc./HAAKE
② Extrusion temperature condition:
Inlet of extrusion-molding machine: 200° C.
Inside of extrusion-molding machine: 240° C.
Outlet of extrusion-molding machine: 230° C.
③ Screw rate of extrusion-molding machine: 100 rpm
[Evaluation of Extrusion-Moldability]
Excellent: cracks and protrusions were not created on the surface of extruded material.
Improvement is needed: fine cracks and protrusions were created on the surface of extruded material.
Bad: breakage caused by cracks or rough surface and protrusions are created during extrusion.
(3) Evaluation of Physical Properties of Extrusion-Molded Material Physical properties of the respective molded articles produced by extrusion-molding were evaluated by the following method.

Measurement of Specific Gravity

An extrusion-molded material was cooled at room temperature and cut to a size of 20 mm×20 mm×50 mm to obtain a sample and specific gravity was measured at 25° C. and 1 atm without applying an exterior force with an electronic densimeter (produced by Alfa Mirage Co., Ltd.).

Measurement of Folding Endurance

An extrusion-molded material was cooled at room temperature and cut to a size of 300 mm×150 mm×100 mm to obtain a sample and a force was continuously applied to the sample until both ends of the sample cracked. Folding endurance was evaluated depending on whether or not the sample cracked.

Measurement of Adhesive Strength

An extrusion-molded material was cooled at room temperature and cut to a size of 20 mm×25.4 mm to obtain a sample and the sample was attached to a vehicle wheel, and adhesive strength was measured using a universal test machine (Zwick Corp.) at a rate of 50 mm/min and 25 mm/min.

On the other hand, Comparative Examples 1, 2 and 5 containing no epoxy resin in the resin base had bad extrudability or needed improvement thereof. Comparative Example 2 contained an excessive amount of ionically cross-linked elastomer, thus exhibiting a rough extruded material surface and difference in density of the extruded material which results from presence of an un-melted ionically cross-linked elastomer in the extruded material due to difference in high-temperature flowability.

In addition, Comparative Example 3, Comparative Example 4 and Comparative Example 5 had no ionically cross-linked elastomer in the base resin, thus exhibiting deterioration in extrudability and bad folding endurance due to low flexibility and elasticity during extrusion-molding.

Figure 2:
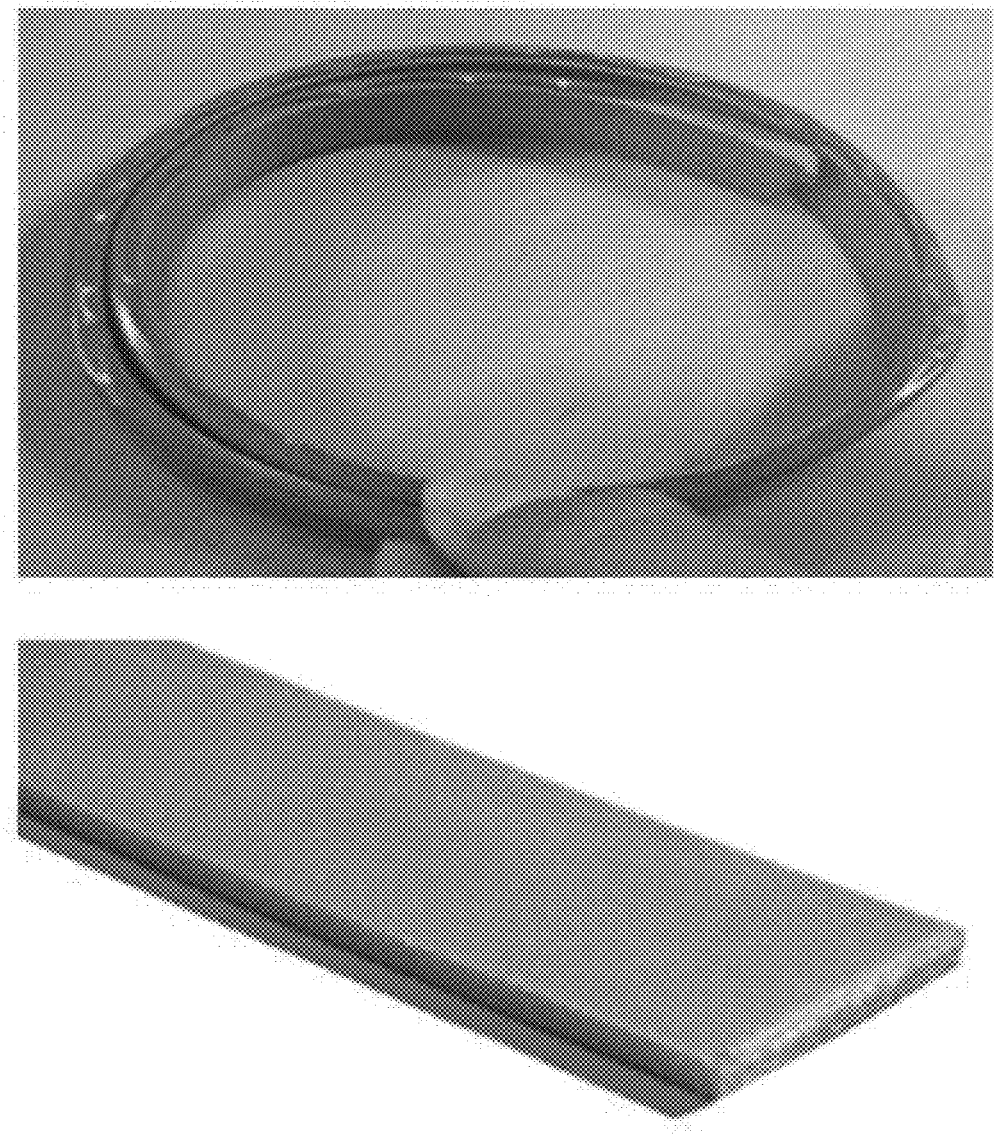
FIG. 2 shows images showing an extrusion-molded balancing weight produced in accordance with embodiments of the present invention.

Meanwhile, FIG. 1 shows images of a typical molded balancing weight and FIG. 2 shows images of an extrusion-molded balancing weight according to embodiments of the present invention, respectively.

The typical molded balancing weight of FIG. 1 is manually attached and is used as a 5 g unit weight and has a problem of deteriorated accuracy. When the balancing weight is applied to a vehicle wheel, initial peeling occurs due to deteriorated conformability, and detachment and peeling are generated due to corrosion when used for a long time.

On the other hand, FIG. 2 shows an extrusion-molded balancing weight according to embodiments of the present invention and the extrusion-molded balancing weight could be cut and attached by an automatic process and accuracy thereof was significantly improved because it was used as a weight of less than a 1 g unit. In addition, when the balancing weight was applied to a vehicle wheel, it could be attached along the curved surface of the vehicle wheel due to excellent conformability and was neither corroded nor detached despite being used for a long time.

As apparent from the foregoing, embodiments of the present invention has excellent eco-friendliness and prevents a rusting problem because stainless steel is used as a high-density mass material and a harmful metal such as lead (Pb) is not used.

TABLE 1

| | | Example | Comparative Example | | | | |
|---|---|---|---|---|---|---|---|
| Item | | 1 | 1 | 2 | 3 | 4 | 5 |
| Resin base composition | Engineering plastic | 85 | 90 | 80 | 90 | 95 | 100 |
| | Epoxy resin | 5 | 0 | 0 | 10 | 5 | 0 |
| | Ionically cross-linked elastomer | 10 | 10 | 20 | 0 | 0 | 0 |
| | Total (wt %) | 100 | 100 | 100 | 100 | 100 | 100 |
| SUS630 powder/resin base (parts by weight) | | 100/10 | 100/10 | 100/10 | 100/10 | 100/10 | 100/10 |
| Evaluation | Extrudability | Excellent | Improvement is needed | Improvement is needed | Improvement is needed | Improvement is needed | Bad |
| | Specific gravity | 4.82 | 4.90 | 4.66 | 4.86 | 5.05 | 5.20 |
| | Folding endurance | Excellent | Excellent | Excellent | Excellent | Bad | Bad |
| | Adhesive strength (Kgf/cm$^2$) | 8.18 | 7.84 | 7.49 | 7.98 | 7.07 | 6.52 |

As can be seen from results shown in Table 1, the balancing weight according to embodiments of the present invention satisfied all of extrudability, folding endurance and adhesive strength.

Embodiments of the present invention can improve accuracy because a resin base is used and a unit weight can be thus reduced to 1 g or less. In addition, by controlling resin base ingredients and contents thereof, extrusion flowability and adhesive strength to curved surfaces of wheels are improved and interface detachment and peeling upon use for a long time are reduced.

In addition, the process of producing a balancing weight according to embodiments of the present invention is an extrusion molding process to which an automatic process is applied and is thus useful for mass-production.

In addition, the composition according to embodiments of the present invention is useful as a material for balancing weights applied to vehicle wheels.

The invention has been described in detail with reference to embodiments thereof. However, it will be appreciated by those skilled in the art that changes may be made in these embodiments without departing from the principles and spirit of the invention, the scope of which is defined in the appended claims and their equivalents.

What is claimed is:

1. A balancing weight composition comprising:
   a stainless steel powder; and
   a resin base,
   wherein the resin base comprises:
      80 to 90% by weight of a polyester-based engineering plastic;
      1 to 10% by weight of an epoxy resin; and
      5 to 15% by weight of an ionically cross-linked elastomer produced by graft-polymerizing an EPDM rubber and a carboxylic acid monomer,
   wherein the resin base is present in an amount of 5 to 15 parts by weight, based on 100 parts by weight of the stainless steel powder.

2. The balancing weight composition according to claim 1, wherein the polyester-based engineering plastic comprises at least one selected from the group consisting of polyethylene terephthalate (PET), polybutylene terephthalate (PBT), polyethylene naphthalate (PEN) and polybutylene naphthalate (PBN).

3. The balancing weight composition according to claim 1, wherein the epoxy resin is a room-temperature curable two-component type epoxy resin.

4. The balancing weight composition according to claim 1, wherein the logically cross-linked elastomer is a copolymer obtained by grafting 1.45 to 200% by weight of the carboxylic acid monomer with respect to the weight of the EPDM rubber.

5. A high-density molded material obtained by extrusion-molding the composition according to claim 1.

6. A balancing weight obtained by extrusion-molding the composition according to claim 1.

7. A vehicle wheel comprising the balancing weight according to claim 6.

* * * * *